United States Patent [19]
Pedersen

[11] Patent Number: 6,099,743
[45] Date of Patent: *Aug. 8, 2000

[54] METHOD AND BASIN FOR SEDIMENTATION OF SLUDGE IN WASTE WATER

[75] Inventor: John E. Pedersen, Odense N, Denmark

[73] Assignee: Odense Vandselskab A/S, Odense, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,204

[22] PCT Filed: Feb. 8, 1996

[86] PCT No.: PCT/DK96/00063

§ 371 Date: Nov. 19, 1997

§ 102(e) Date: Nov. 19, 1997

[87] PCT Pub. No.: WO96/25216

PCT Pub. Date: Aug. 22, 1996

[30] Foreign Application Priority Data

Feb. 17, 1995 [DK] Denmark .................................. 0180/95

[51] Int. Cl.[7] .................................................. B01D 21/24
[52] U.S. Cl. .......................... 210/801; 210/519; 210/521; 210/526; 210/528
[58] Field of Search .................................... 210/801, 519, 210/521, 526, 528, 532.1

[56] References Cited

U.S. PATENT DOCUMENTS

| | | | |
|---|---|---|---|
| 2,122,385 | 6/1938 | Scott | 210/528 |
| 2,635,757 | 4/1953 | Walker | 210/801 |
| 2,708,520 | 5/1955 | Dallas | 210/528 |
| 2,799,645 | 7/1957 | Musgrove | 210/801 |
| 3,486,628 | 12/1969 | Darby | 210/528 |
| 3,539,051 | 11/1970 | Stone . | |
| 3,926,805 | 12/1975 | Walker | 210/519 |
| 3,966,617 | 6/1976 | Zaenkert | 210/519 |
| 4,722,800 | 2/1988 | Aymong | 210/519 |
| 5,378,378 | 1/1995 | Meurer | 210/801 |
| 5,384,049 | 1/1995 | Murphy | 210/519 |
| 5,503,747 | 4/1996 | Vion et al. | 210/519 |
| 5,605,636 | 2/1997 | Wyness | 210/801 |

FOREIGN PATENT DOCUMENTS

| | | |
|---|---|---|
| 3305344 | 4/1988 | Germany . |
| 441169 | 1/1968 | Switzerland . |
| 208552 | 3/1968 | U.S.S.R. . |
| WO89/09193 | 3/1989 | WIPO . |
| 95 01215 | 1/1995 | WIPO . |

OTHER PUBLICATIONS

Degremont, "Water Treatment Handbook", 1973, Fourth English Edition, p. 128, figure 75.

*Primary Examiner*—Christopher Upton
*Attorney, Agent, or Firm*—Pennie & Edmonds LLP

[57] ABSTRACT

A method and a basin serve the purpose of sedimenting sludge in waste water, which in a flow is supplied to the basin via an inlet and in clarified condition is removed via an outlet placed opposite to the inlet. In the inlet there has been built in resistances of flow which create a heavy turbulence in the water flowing and transform a substantial part of the energy of flow from the water into energy in the whirls which create the turbulence. Thereby there are created flow conditions which increase the creation of sludge flocs and the succeeding sedimentation of these.

19 Claims, 7 Drawing Sheets

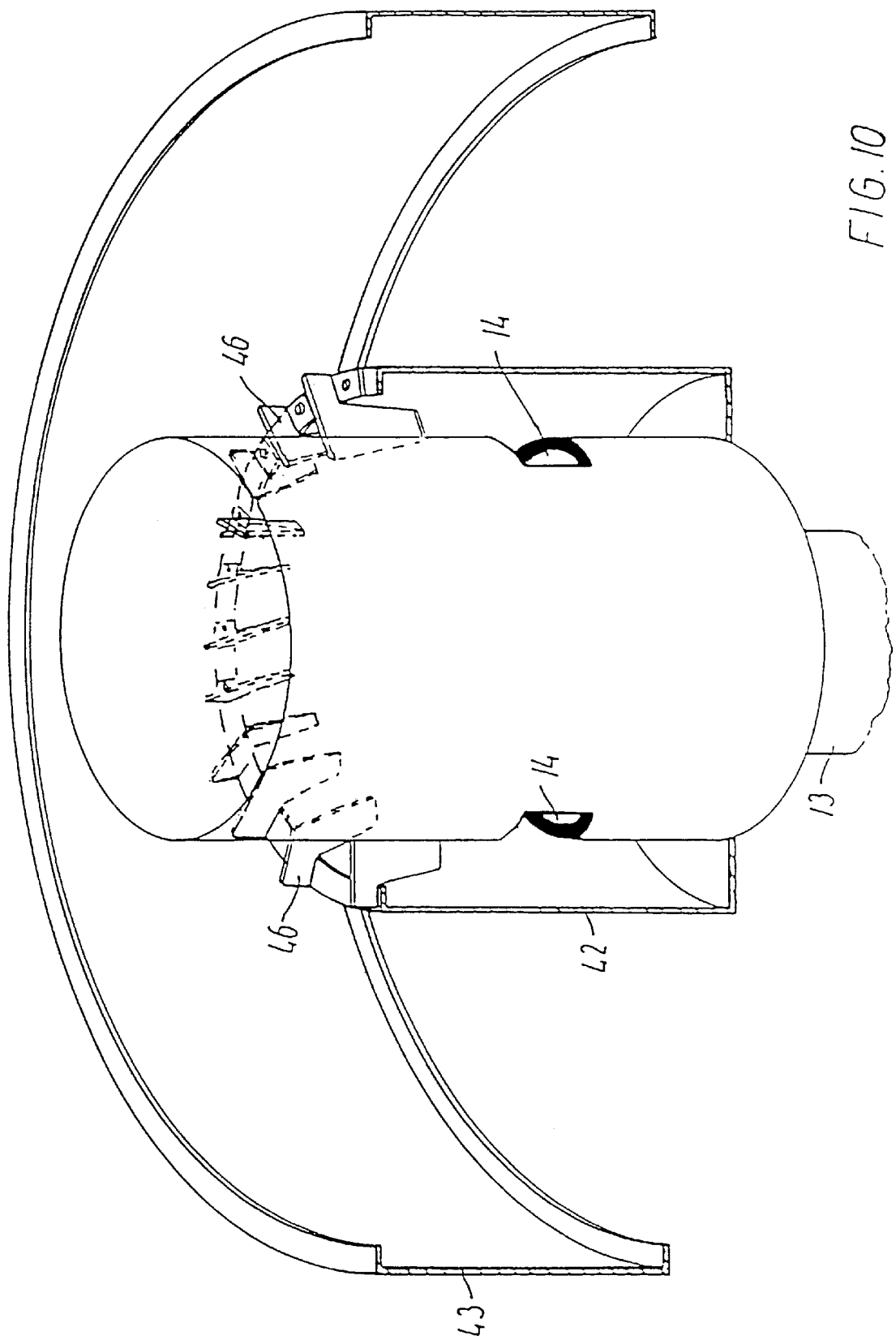

METHOD AND BASIN FOR SEDIMENTATION OF SLUDGE IN WASTE WATER

This application is the national phase of international application PTC/DK96/00063, filed Feb. 8, 1996 which was designated the U.S.

BACKGROUND OF THE INVENTION

1. Field of the Invention

The invention relates to a method for sedimentation of sludge in waste water, which in a stream is supplied to a sedimentation basin via an inlet and in clarified condition is removed via an outlet placed opposite to the inlet.

2. Prior Art

Before waste water can be discharged to the receiver it has to be clarified to such an adequate extent that it can meet the present outlet requirements. In a typical waste water treatment plant this treatment takes place in successive process steps, where the elements of solid and suspending materials in the waste water are treated and/or removed.

The solid materials are mainly removed by means of a mechanical clarification which is followed by a sedimentation of sludge in a primary clarifier. From there, the waste water is directed further on to an aeration basin, where the contents of the waste water of different types of polluting elements are decomposed and transformed to more harmless compound as biological sludge.

Finally, the biological sludge coming from the water will be separated by sedimentation in a secondary clarifier, whereafter the treated water in most cases can be discharged to the receiver. The sedimented sludge is returned to the aeration basin, where it is a part of the biological treatment process. Surplus sludge is pumped out of the aeration basin and is drained off, whereafter it normally can be spread over the agricultural areas.

Initially, the sludge in the waste water supplied to the secondary clarifier, will normally be small primary particles, which cannot or only with difficulty be able to sediment. The primary particles will first have to be gathered to larger particles or flocs in a process, which is called flocculation and takes place when the waste water by slightly stirring will be brought to gradients of velocity at a size suitable enough to make the small primary particles collide and stick together in flocs. If the gradients of velocity are too big, the flocs will, however, decompose faster than they are formed, and if they are too small, the flocs will not be formed. A sedimentation can therefore only take place in a secondary clarifier, if the gradients of velocity in the waste water have such a size, that it is within the limits of a certain interval.

Secondary clarifiers are normally constructed as either round or rectangular basins. Each basin has an inlet to direct the waste water into the basin, and an outlet to direct the treated water out of the basin. In circular basins the inlet is placed in the middle of the basin and the outlet along the perifery. In rectangular basins the inlet is placed at one end and the outlet at the opposite end.

In both cases the waste water in the basin will flow from the inlet to the outlet at an adequate low speed in order to make the sludge being able to sediment. The sludge sedimented is, by means of a bottom scraper, transported into the opposite direction to a sludge pit, from which the sludge, as mentioned before, is pumped back into the aeration basin.

A secondary clarifier has to be able securely and efficiently to sediment the existing biological sludge in the waste water, if the outlet requirements stipulated by the authorities, are to be fulfilled under all circumstances. This is not always the case.

There can by many reasons as to a satisfactory sedimentation is not always obtained. Some of these mentioned here can be insufficient floc creation and inexpedient flow conditions in the basin. Both these phenomenons are especially significant in periods with heavy rain, where a basin can be exposed to hydraulic overload.

The waste water flows via the inlet into the basin at a comparatively high speed, which typically can be about 30–40 m/min. At such high speeds the primary articles will not be able to create flocs. Not until the current of water has been slowed down to much lower speeds, which necessarily have to exist in the secondary clarifier to enable a flocculation to take place, e.g. typically less than 6 m/min., the water current has hat to cover such a long distance that it has reached the area above the sedimented sludge blanket, where the current therefore sets the water into movement towards the outlet in the shape of an undercurrent. At the same time, in compensation for the amount of water, which the undercurrent brings along, a surface current is formed with direction from the outlet to the inlet.

This current pattern is for obvious reasons very unfortunate. The undercurrent raises the sludge already sedimented having the effect that some of it is carried away and gets mixed in the water, which has already been treated. Between the surface current and the undercurrent there is, however, a zone with sufficiently calm water allowing the sludge flocs to be created. The sludge flocs will, however, have difficulty in sinking and sedimenting, since the flocs, due to the calm character of the water, are inclined to stick together as a kind of blanket without openings for the passage of the amount of water which necessarily has to be forced out to enable the flocs to be able to sink.

The European patent publication No. 0 386 163 B1 discloses an apparatus to insert in the inlet of a sedimentation basin. The apparatus consists in principle of two, one inside the other, cylindrical walls placed concentrically and limiting a space. The waste water is directed via a tangientially placed inlet into this space, which the water after en upwards rotation movement leaves via an incision in the upper part of the cylindrical walls. The movement, which the water at the same time is describing, has the character of a whirl with radial gradients of velocity of such a size, that it allows the sludge willingly to flocculate. In order to avoid that the flocs already created will not immediately after be decomposed again by the inner turbulence in the whirl, it is necessary that the waste water meets less possible resistance when it flows through the apparatus. Therefore the water flows out of the apparatus with more or less the same contents of energy, and therefore it creates a heavy movement and turbulence in the water which is present in the outlet area. Thereby the sludge flocs, which were created during the passage in the apparatus, are decomposed and the heavy currents of water, which afterwards are created in the water of the basin, will counteract a subsequent flocculation and sedimentation.

SUMMARY OF THE INVENTION

The object of the invention is to provide a method of the type mentioned in the opening paragraph, which faster and better than seen up till now, can flocculate and sediment sludge in waste water.

The new and unique whereby this is obtained, is according to the invention, that an essential part of the potential and kinetic energy in the supplied water flow is transformed into kinetic energy in whirls during the passage of the inlet. Thereby expedient flow conditions are obtained in the secondary clarifier with optimum velocities for creation of sludge flocs. Another advantage is that the very large number of whirls, created during the water's passage of the inlet, now will set the water in the basin in suitable stirring covering a large area so that the suspended sludge particles in the water will be brought to collide and stick together in flocs. At the same time the whirls create openings for passage of the water that is displaced out, when the flocs sink. The flocculated sludge will therefore now quickly and efficiently sediment.

When during the passage of the inlet so much energy is removed from the current of water, that it, after having passed the inlet, not any longer has sufficient energy to penetrate down to an area near the sedimented sludge on the bottom of the basin and create an undercurrent with direction towards the outlet of the basin, the already sedimented sludge will not be whirled up again, and the sludge flocs created will freely be able to sink and sediment.

The remaining energy will now, however, set the water at the surface zone into a positive movement in direction towards the outlet, and when this energy is large enough to create a mass flow, which is suitable much larger than the mass flow of the supplied waste water, an undercurrent can be created above the sedimented sludge, which undercurrent has approximately the same velocity and direction as the bottom scraper is wandering so that the bottom stream will not raise the sedimented sludge, but on the contrary the work of the scraper will contribute to the transportation of the sludge to the sludge pit.

The transformation of the energy from the supplied current of water into energy in whirls during the passage of the inlet can advantageously take place by exposing the current of water to substantial flow resistances, which for example can be to the effect that the current of water abruptly is forced to change direction for a suitable number of times.

The invention also relates to a sedimentation basin for sedimentation of sludge in waste water with an inlet for directing the waste water flow into the basin and an outlet placed opposite to the inlet for directing the clarified waste water out of the basin. The new and unique according to the invention is the fact, that this basin has an inlet with means to transform an essential part of the supplied water stream's potential and kinetic energy to kinetic energy in whirls in passing the inlet.

By an expedient embodiment these means consist of flow resistances in the shape of deflectors, which are placed mainly diagonally to the stream direction of the water. One or more of these deflectors can furthermore be adjustable for optimum transformation of the energy of the water current into whirl energy under different hydraulic loads of the basin.

The deflectors can together limit a flow passage with abrupt change of directions in order to bring the water into a turbulent flow condition with many whirls, one of each taking up part of the energy from the flowing water.

In order to make it possible for a given sedimentation basin to obtain the greatest possible capacity, it is important that the flocculation of the sludge of the water can be initiated already at the outflowing area at the inlet. This is possible when the velocity of the current of water can be brought down to a limit, where flocculation can take place. In order to obtain this, the cross section of the flow passage at the outlet has to be just as much larger than the cross section of the waste water flow at the inlet, as this limit is smaller than the flowing velocity of the waste water at the opening of the inlet.

From the said EP patent publication No. 0 386 163 B1 the known inlet apparatus has the water to flow into the basin across a very short inlet edge. This results in the fact that the velocity at the outflowing area will be much too big to let a flocculation take place, and at the same time heavy and uncontrolled flows are created counteracting a later flocculation. In order to avoid these disadvantages the basin, according to the invention, has an inlet with a length which corresponds to the width of the current of water. The inlet can e.g. extend the whole length of one of the short sides in an rectangular basin, whereby an additional advantage is obtained that the water is brought into a uniform movement towards the outlet across the total extension in the width of the basin.

In circular basins, where the inflowing takes place in the middle of the basin, the area which is being flowed through will change in dependence of the radial distance from the centre. The velocity is therefore highest at the inlet and is decreasing in the directing outwards with the distance to the centre. Consequently, it can be difficult to keep the velocities within the limits where a flocculation can take place, everywhere in the basin, when the water is flowing radially outwards from the inlet to the outlet. If instead letting the water flow helically outwards, the flowing velocities would not to the same degree be dependent of the radial distance from the centre. The water can be given such a helically flowing progress by placing a number of diagonally placed guide blades in a circle around or inside the inlet.

BRIEF DESCRIPTION OF THE DRAWINGS

The invention will be explained more fully by the following description of embodiments, given by way of example, with reference to the drawing, in which FIG. 10 shows, seen in perspective, a section of the inlet shown in FIG. 9 having guide blades diagonally placed in a circle at the top on the inner deflector of the two shown deflectors.

DETAILED DESCRIPTION OF PREFERRED EMBODIMENTS OF THE INVENTION

Figure 1:
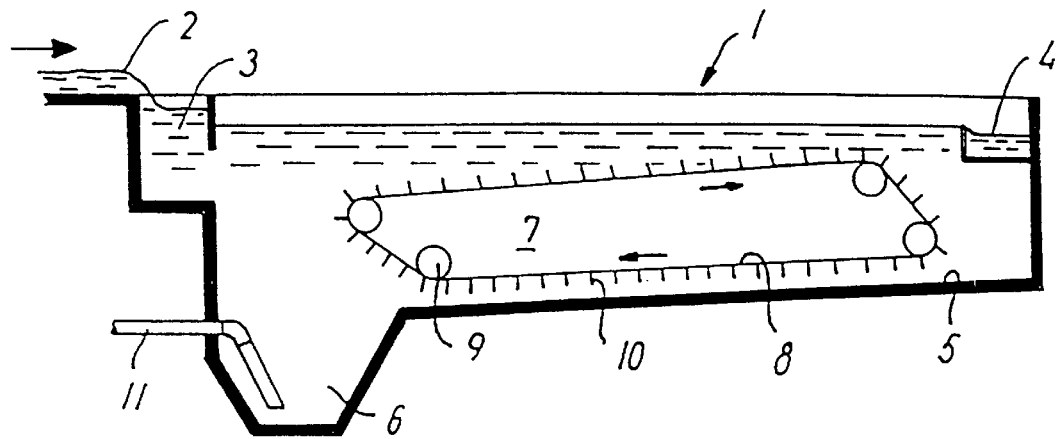
FIG. 1 shows schematically, seen in a longitudinal section, a typical rectangular secondary clarifier.
Figure 2:
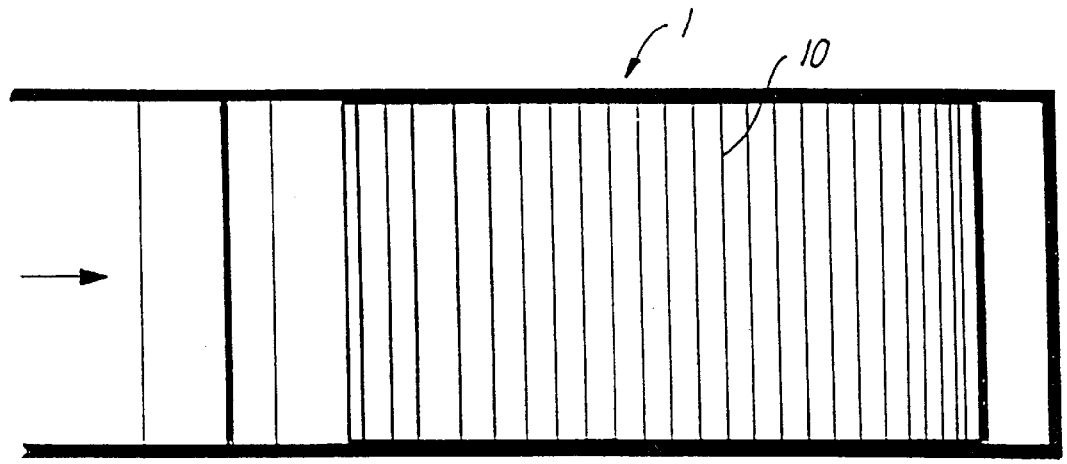
FIG. 2 shows the same basin, seen from above.

FIG. 1 and 2 show a typical rectangular secondary clarifier, which generally is designated by the reference numeral 1. The waste water, which is to be treated, is coming in a flow 2 from an aeration basin (not shown) and is directed into the basin via an inlet 3, which is placed along one of the short sides of the basin. The clarified waste water is directed out of the basin via an outlet 4, which is placed along the other short side of the basin.

The bottom 5 of the basin is in the example shown placed slightly diagonally towards a sludge pit 6 at the inlet end of the basin. In the basin there is furthermore placed a bottom scraper 7, which consists of chains 8, which in direction of the arrows, run across a chain wheel 9 and are provided with scraper blades 10. The scraper serves the purpose of transporting the sedimented sludge to the sludge pit. The collected sludge in this is pumped via a sludge tube 11 back to the aeration basin.

Figure 3:
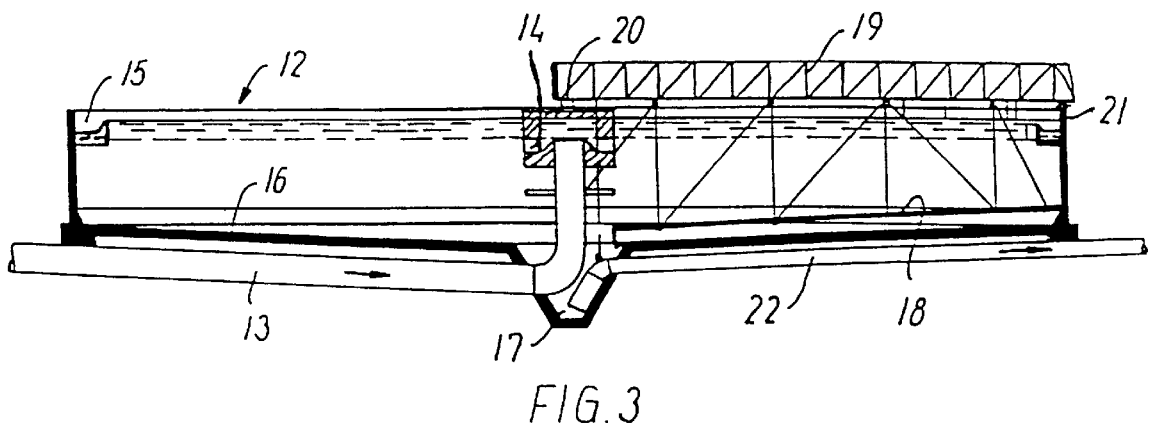
FIG. 3 shows schematically, seen in a cross section, a typical circular secondary clarifier.
Figure 4:
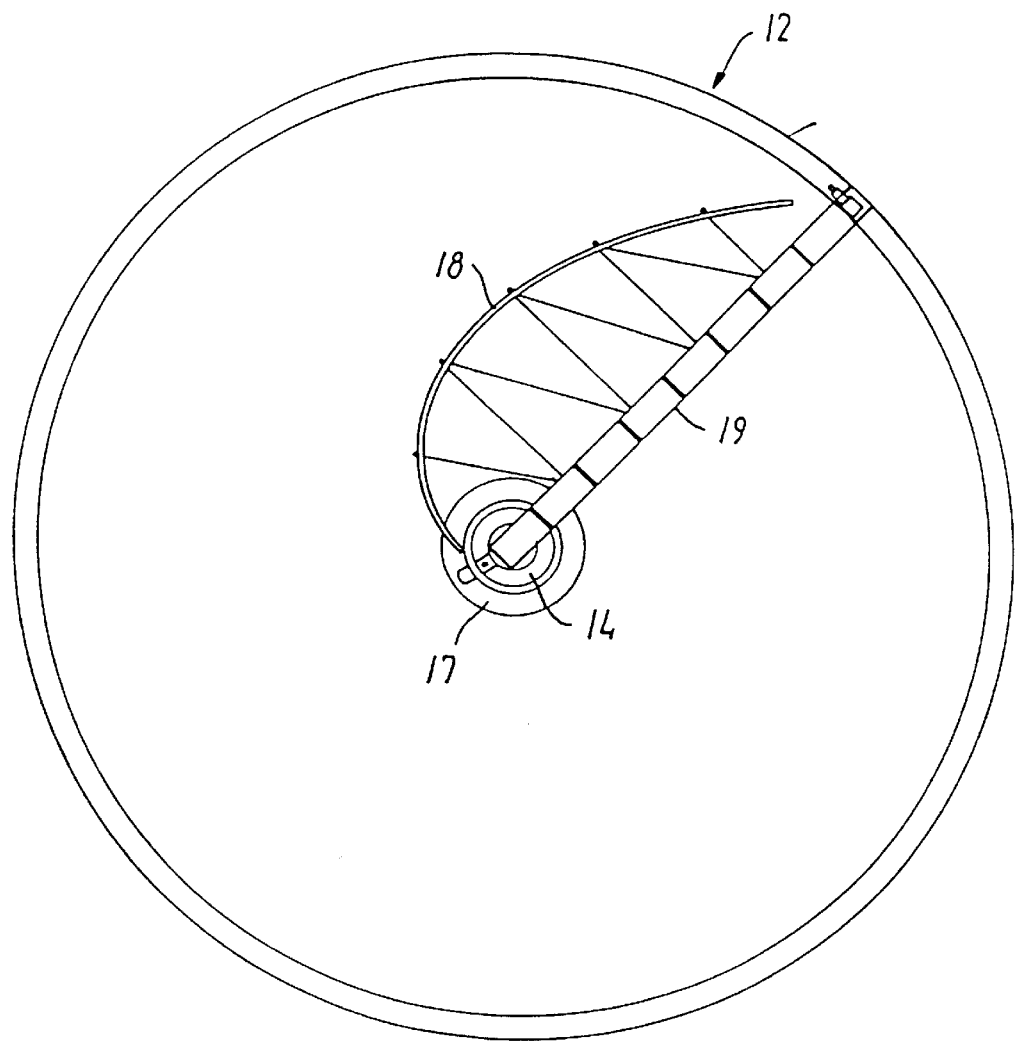
FIG. 4 shows the same basin, seen from above.

In FIG. 3 and 4 a typical circular secondary clarifier can be seen, which generally is designated by the reference numeral 12. The waste water, which is to be clarified, is directed from the aerations basin (not shown) via a tube 13 to an inlet 14 in the middle of the basin. The clarified waste water is directed out of the basin via an outlet 15, which is placed along the perifery of the basin.

The bottom 16 of the basin is in this case also placed slightly diagonally towards a sludge pit 17, which is placed in the middle of the basin below the inlet 14. In the basin is furthermore placed a bottom scraper 18, which is pulled after a scraper bridge 19, the inner end of which is movably mounted on a journal 20 at the top of the inlet and the outer end of which can run on the ring-shaped outer edge 21 of the basin. The scraper serves the purpose of transporting the sedimented sludge to the sludge pit. The collected sludge in this is pumped via a sludge pipe 22 back to the aeration basin.

Figure 5:
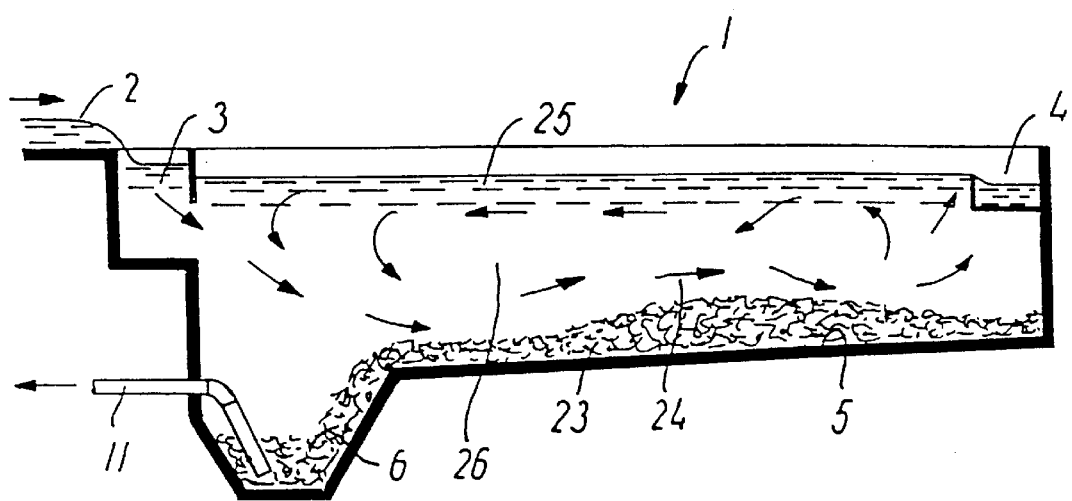
FIG. 5 shows the flowing progress in the basin shown in FIG. 1 without bottom scraper.

FIG. 5 shows the flowing progress in the typical basin shown in FIG. 1. However, the scraper has been removed in order to improve the view of the water flows in the basin. On the bottom 5 is deposited a sedimented sludge blanket 23. The waste water 2 flows in direction of the arrows into the basin at a velocity of typically between 30 and 40 m/min. and will therefore only first slow down to far lower velocities in the basin when it reaches the area above the sludge blanket 23, where the flow, as shown with the arrows, continues as an undercurrent 24 with direction towards the outlet end of the basin. This undercurrent transports the water into the direction of the arrows from the inlet end to the outlet end, whereby a surface current 25 is generated in compensation, which current, as shown by the arrows, transports the water into the opposite direction, that is from the outlet end to the inlet end.

The water in the basin will therefore be circulating in an very unfortunate way. At the inlet the water flows into the basin at such great force that the water at the end of the basin, which is close to the inlet, will be brought to a heavy turbulating flowing condition, which will not allow the sludge to flocculate. Only further up in the basin will the flow slow down so much that the conditions will allow a flocculation to take place. As indicated in the figure, the sludge blanket 24 will obviously be thicker here. The undercurrent runs closely above the sludge blanket and stirs therefore inevitably much of this up, so that sludge, which already had been sedimented, is pulled up into the surface current 25, where the sedimentation process then has to start all over again. A renewed sedimentation will, however be neutralised by the following two conditions, which both are a result of the unfortunate flowing progress.

In the first place the sludge flocs, which sink towards the bottom, will be caught by the undercurrent 24 and be put into re-circulation without having the opportunity to sediment. In the second place, between the undercurrent 24 and the surface current 25, a zone 26 will arise having rather calm water, where the conditions for flocculation are present, but in this zone the flocculation will have the character of a coherent blanket without openings. This floc blanket will remain standing in the zone 26, since the flocs and the water necessarily will have to be able to pass one another, if the flocs shall be able to sink. Such a passage is, however, not possible, when the floc blanket does not have any holes for passage of the water.

Figure 6:
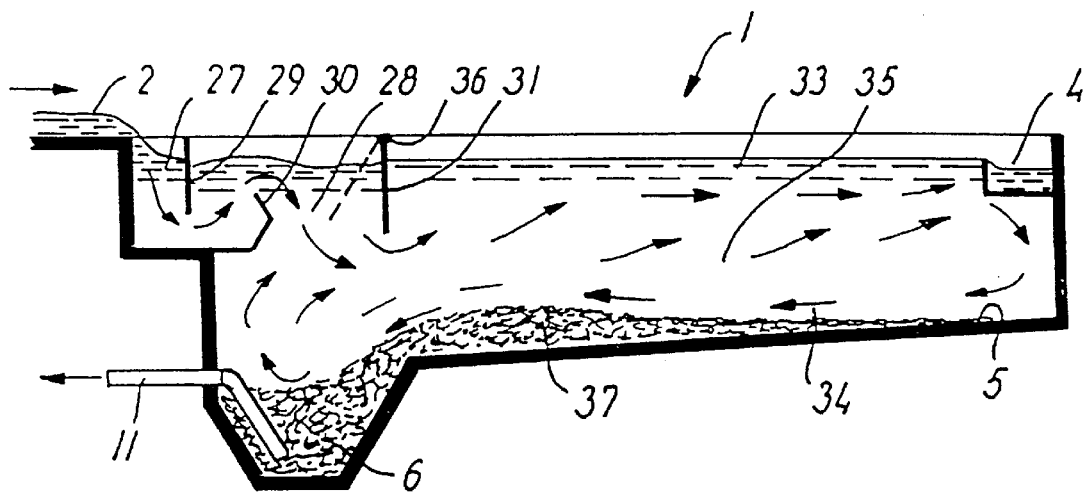
FIG. 6 shows the same basin, but now with an inlet according to the invention.

Said problems are relieved with an inlet 27 according to the invention, which inlet is placed in the basin shown in FIG. 6, and which basin in every respect is corresponding the one shown in FIG. 5. Similar parts have consequently been provided with the same reference number.

In this case, the inlet is constructed with a rather long flowing passage 28, which is limited by deflectors 29, 30 and 31, which are placed diagonally to the flowing direction at the same extension as this and/or the width of the basin. The passage will give very much resistance to the flowing of the water, and especially because the water abruptly has to change direction each time it flows around one of the edges of the deflectors. Thereby the water is set into a heavy turbulence with numerous whirls, each of which will take up part of the energy of the water flow.

The velocity of the flow will at the same time successively be reduced and can at the end of the inlet advantageously be selected to be between ¼ and 10 m/min., preferably between 1 and 8 m/min., and especially between 2 and 6 m/min., all of which are velocity areas in which a more or less successful flocculation can take place. The flocculation and the sedimentation will therefore start already after the inlet, so that the capacity of the basin can be exploited as best as possible. Opposite to the sludge blanket 23 in the conventional basin shown in FIG. 5, the sludge blanket 32 in the basin according to the invention will be thickest at the end of the basin which is nearest to the inlet.

During the flow of the waster trough the passage 28 its velocity will gradually be reduced to e.g. the velocities said before, in which case the cross section of the passage will have to be increased concurrently with the velocity being reduced. The cross section of the flow passage at the outlet will therefore have to be at least just as much larger than at the inlet as the velocity of flow is reduced during the flowing.

When the current of water leaves the flow passage it has then lost so much energy that it no longer will be able to penetrate deeply into the water at the inlet. The current of water will therefore have to remain in the surface region where it continues in a surface current 33 with direction towards the outlet 4. The surface current transports water from the inlet end to the outlet end, whereby in compensation a undercurrent 25 is generated, which, as shown by the arrows, transports water into the opposite direction, that is from the outlet end to the inlet end.

This circulating flow condition is very fortunate for the flocculation and the sedimentation in the basin. By adequate construction of the flow resistance at the inlet the velocity of the undercurrent can be brought to correspond to the velocity with which the scraper (FIG. 1) scrapes the sedimented sludge to the sludge pit 6. The undercurrent will not, as is the case with conventional basins, stir up the sludge blanket, but will on the contrary assist the scraper in taking the sludge to the sludge pit. Sludge flocs, which are sinking to the bottom, will in fact be caught by the weak undercurrent, but will advantageously be directed by this latter to be deposited in the sludge pit instead of be set into recirculation as is the case with conventional basins.

As said the flocculation can now begin already after the inlet. In the succeeding surface current 33 and in a zone 35 with rather calm water between the two currents 33, 34 there has at the same time be obtained maximum conditions for a flocculation being able to take place. This is due to the fact that the water area above the undercurrent is crossed and recrossed by the great number of whirls, which were created when the waste water flowed through the inlet, and which now slowly dies out on their way towards the outlet. These whirls stir the water and create everywhere gradients of velocity, and this fact is carrying forward the creation of the flocs. This creation of flocs can therefore also in this case very well have the character of a blanket, but this blanket is, however, now penetrated by the many widely scattered whirls which allow the water to flow through the blanket while it is sinking to the bottom. The flocs created will therefore rapidly and safely sink and be sedimented.

The hydraulic load of a secondary clarifier can variate to a great extent and depends a.o. of how much rain is falling. In order to obtain optimum operating conditions at all circumstances in the basin, the flow resistance in the flow passage 28 is adjustable, since the deflector 31 can be turned around a hinge 36. When the deflector 31 stands in the angle position shown with the dotted line in FIG. 6, the flow resistance at the inlet will thus be larger than when the deflector stands in the position shown with the full-drawn line.

Figure 7:
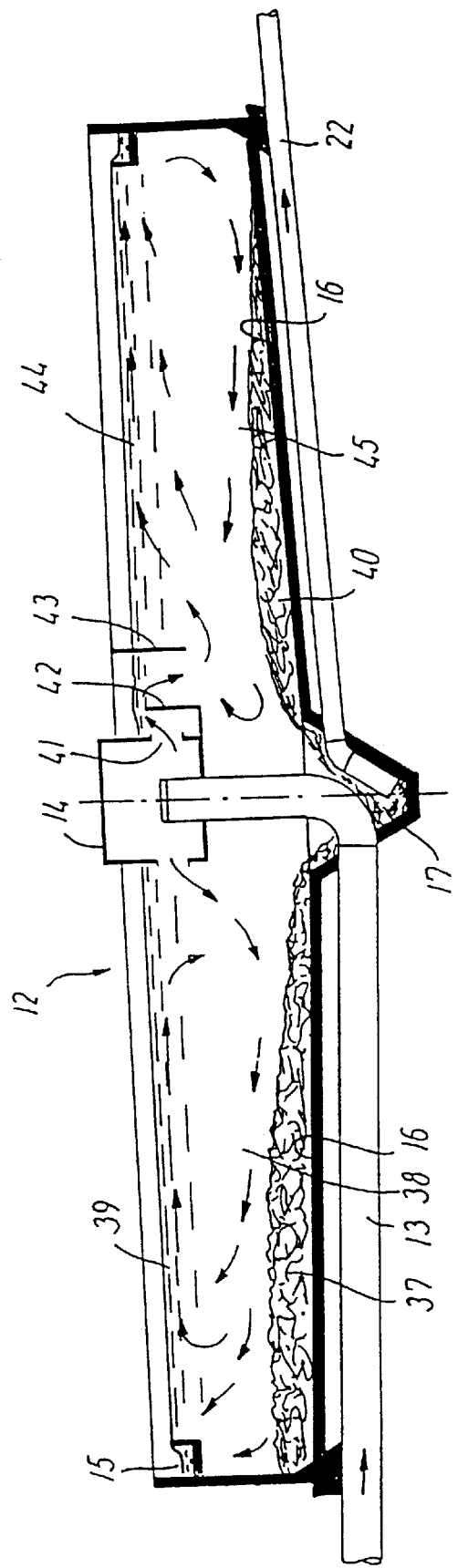
FIG. 7 shows the flowing progress in the basin shown in FIG. 3 without bottom scraper and with a conventional inlet at the left side of the figure and an inlet according to the invention at the right side of the figure.

FIG. 7 shows the flow progress in the shown circular basin 12 from FIG. 3. The scraper has, however, been removed so that the flows in the water easier can be seen. Left side of the figure shows a basin with a conventional inlet and right side has an inlet according to the invention.

In FIG. 7's left side, which shows a conventional circular basin, a sedimented sludge blanket 37 is deposited on the bottom 16. The waste water flows, in the direction of the arrows, into the basin at a velocity typically between 30 and 40 m/min. and are slowed down to the far less velocities in the basin at the area above the sludge blanket 37, where the flow, as shown by the arrows, continues as an undercurrent 38 with direction towards the perifery of the basin. This undercurrent transports the water into the directions of the arrows from the middle out to the perifery, whereby a surface current 39 is generated as compensation, which surface current, as shown by the arrows, transports the water into the opposite direction, that is from the perifery towards the middle.

The disadvantages arising as a result of this flow progress correspond more or less to the disadvantages said above in connection with the descriptions of the flow progress in the typical rectangular basin shown in FIG. 5.

Figure 9:
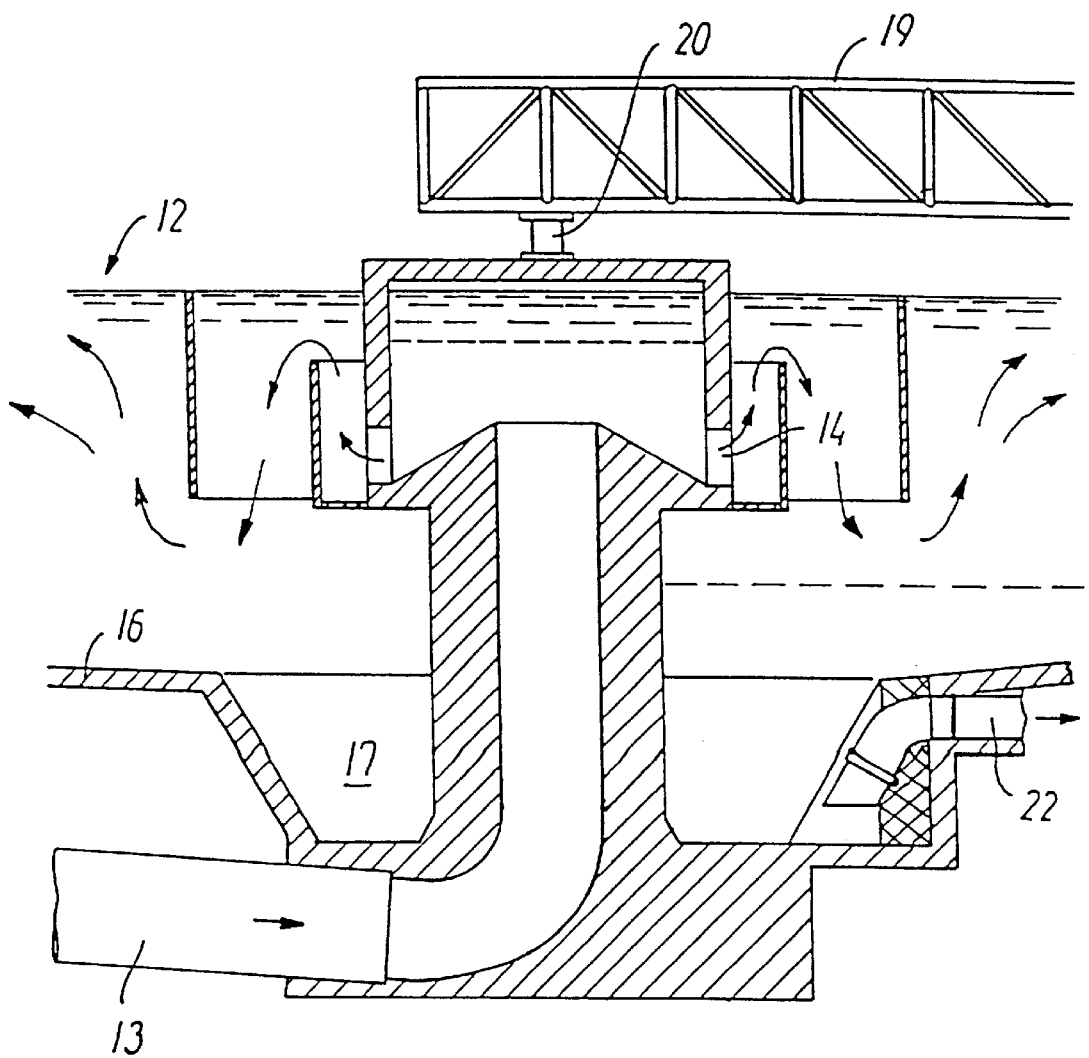
FIG. 9 shows in a larger scale, seen in cross section, a section of a circular basin with an inlet according to the invention.

At FIG. 7's right side, which shows a circular basin according to the invention, is deposited a sedimented sludge blanket 40 on the bottom 16. In this case the inlet is constructed with a rather long flow passage 41, which is limited by ring-shaped deflectors 42, 43, placed around the inlet 14. This construction can be seen in a larger scale in FIG. 9. The passage gives a high rate of resistance to the flow of the water and especially because the water abruptly has to change direction each time it flows around the edges of one of the deflectors. Thereby the water is set into a heavy turbulence with a countless number of whirls, each of which takes up a part of the energy from the flow.

When the current of water leaves the flow passage, it has now lost so much energy, that it no longer can penetrate deeply into the water at the inlet. The current of water will therefore have to remain in the surface area, where it continues in a surface current 44 into the direction of the arrows towards the perifery. This surface current transports water from the middle out to the perifery, whereby an undercurrent 45 is generated as compensation, which undercurrent, as shown with the arrows, transports water into the opposite direction, that is from the perifery towards the middle.

The advantages obtained by means of this flow progress, correspond more or less to the advantages said above in connection with the description of the flow progress in the rectangular basin according to the invention as shown in FIG. 6.

The flow progress in a circular basin differs, however, to some extent from the flow progress in a rectangular basin since the velocity in the circular basin decreases with the distance from the centre of the basin, while it is more uniform in the longitudinal direction of the rectangular basin. Therefore, it can be difficult to keep the velocities within the limits, where flocculation can take place, everywhere in the circular basin.

In FIG. 10 is shown sectionally, in a larger scale, in perspective the inlet according to the invention from the right side of FIG. 7, which inlet has the inner ring-shaped deflector 42 and the outer ring-shaped deflector 43. At the top of the inner deflector 42 there is along the perifery at equidistant distances placed a number of diagonally guide blades 46, which gives the water, streaming above the upper edge of the inner deflector, a tangential component of velocity which sets the water in the basin into rotation around the centre. Thereby the water is forced to flow through the area of the circular basin in a path more or less helical under the influence of a centrifugal force which increases with the distance from the centre. While the velocity of flow by radial outflow decreases with the distance from the centre, the centrifugal force will therefore to the contrary increase the velocity with the distance from the centre, whereby the result will be a rather uniform velocity of flow everywhere in the basin. If the helix rotates in the same direction as the scraper, the tangential component of velocity supports the work of the scraper in scraping the sedimented sludge to the sludge pit 17.

Figure 8:
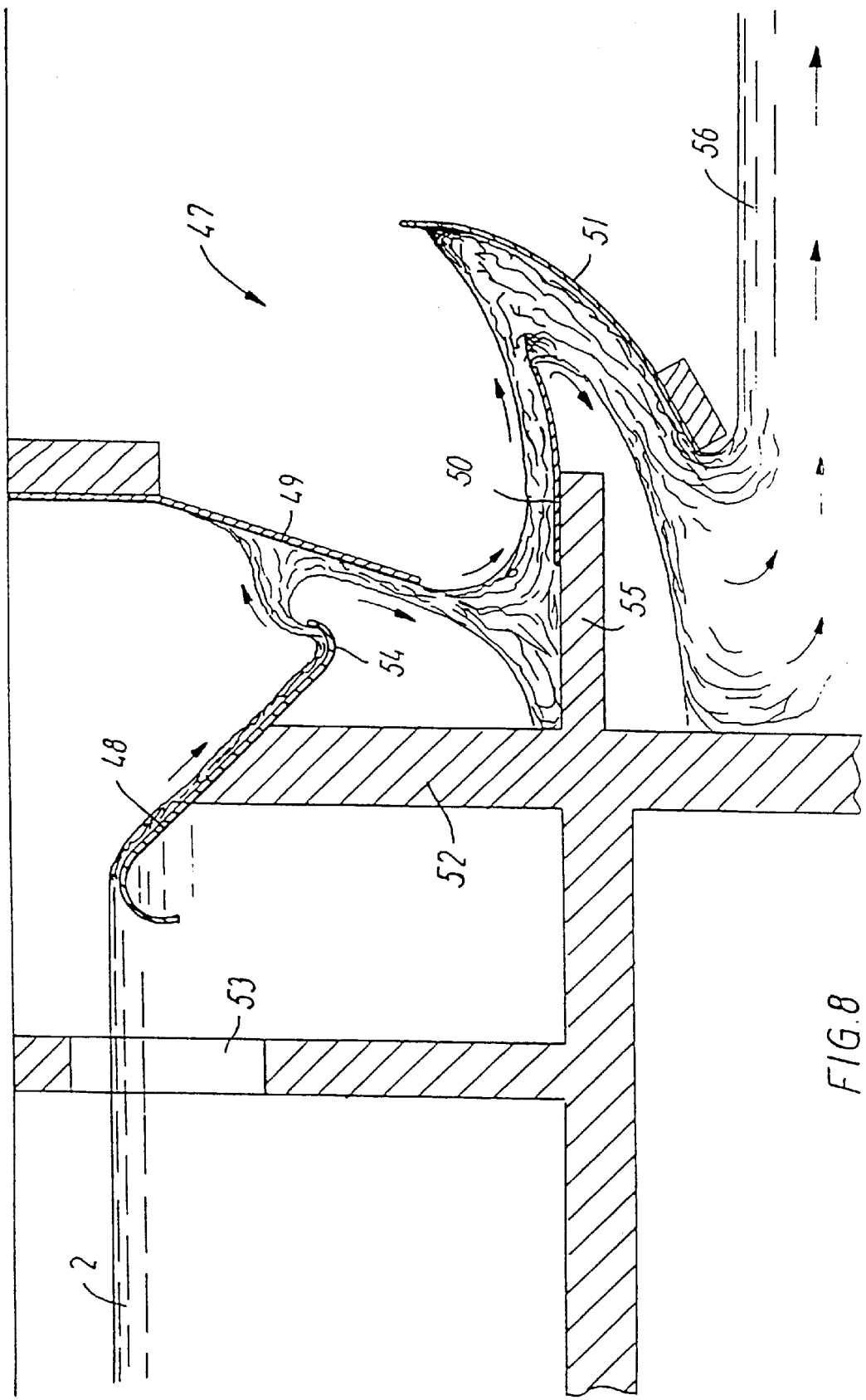
FIG. 8 shows in a larger scale, seen in cross section, a section of a rectangular basin with an inlet according to the invention.

In FIG. 8 is seen another embodiment for an inlet for a secondary clarifier according to the invention. This inlet, which as a whole is referred to with the numeral 47, is built up by more or less diagonal deflectors 48, 49, 50 and 51, mounted on the concrete construction 52 of the basin.

The waste water 2 flows into the direction shown by the arrow, via an opening 53 in the concrete construction 52 into the inlet 47 and down across the first deflector 48 of this latter, which deflector at the bottom is bended upwards to a semicircular groove 54. When the water meets this groove, it is hurled diagonally upwards and hits the opposite second deflector 49 with great force, whereafter the water runs down on the horizontal part 55 of the concrete construction 52 and the third deflector 49, which again directs the water towards the curved third deflector 51, from which the water finally runs down into the water 56 of the basin. The many and heavy changes of direction which the water is forced to undergo and the thereto connected great power effect will deliver the flowing water to the water 56 of the basin in a heavy turbulent condition and at velocities of flow within the flocculation interval.

Above is the invention described from the presumption that it was used for a secondary basin. It goes without saying that it might just as well be used in a primary basin or for that matter any other container with a process based on flocculation and sedimentation of solids in a liquid.

The deflectors shown and described are only mentioned as examples to state how flow resistances at the inlet of the basin can be build up, and the resistances can thus within the scope of the invention optionally be produced in many other ways, e.g. with perforated plates through which the water has to flow, or with rotating water wheels which regain part of the inflow energy of the water.

What is claimed is:

1. A method of removing sludge from waste water by flocculation, comprising the steps of:
   a) forcing a flow of sludge containing waste water to abruptly change direction a number of times in succession to form whirls that create an optimum velocity for formation of sludge flocs;
   b) directing the waste water flow into a basin at a decreased flow rate which is sufficient to form whirls and to form sludge flocs along a circular flow path in the basin to facilitate sedimentation of the sludge flocs for collection and removal at a lower portion of the basin and movement of sludge depleted water away from the sludge flocs toward an upper portion of the basin for removal;
   c) removing the sludge flocs from the lower portion of the basin; and
   d) removing the sludge-depleted water from the upper portion of the basin.

2. The method of claim 1 wherein the sludge containing waste water has a velocity of 30 to 50 meters per minute while forced to change direction, and has a velocity of between 0.25 and 10 meters per minute along the circular path in the basin.

3. The method of claim 2 wherein the sludge containing waste water has a velocity of between 2 and 6 meters per minute along the circular path in the basin.

4. The method of claim 1 wherein the sludge is forced to abruptly change direction at least three times.

5. The method of claim 1 which further comprises providing the basin with a sloped bottom which terminates in a sludge pit which collects sludge flocs; and removing the sludge from the sludge pit.

6. The method of claim 5 wherein the circular flow path of the waste water in the basin is along the sloped bottom and towards the sludge pit to assist in directing the sludge flocs toward the sludge pit.

7. The method of claim 6 wherein the bottom is sloped upwardly from the inlet to the outlet.

8. The method of claim 7 wherein the waste-water is forced to change direction at least three times before entering the basin and the sludge depleted water moves along towards an outlet after entering the basin such that the surface current flows in an opposite direction to that of the sludge flocs along the sloped bottom of the basin.

9. The method of claim 8 wherein the water velocity decreases with each subsequent abrupt change in direction.

10. The method of claim 6 which further comprises scraping the sludge flocs along the bottom of the basin toward the sludge pit.

11. A sedimentation tank for removing sludge from waste water by flocculation, which comprises:
    a) an inlet containing a plurality of baffles for forcing a flow of sludge containing waste water to abruptly change direction a number of times in succession to form whirls that create an optimum velocity for formation of sludge flocs;
    b) a basin for receiving waste water flow from the inlet at a decreased flow rate which is sufficient to form whirls and to form sludge flocs along a circular flow path in the basin to facilitate sedimentation of the sludge flocs for collection and removal at a lower portion of the basin and movement of sludge depleted water away from the sludge flocs toward an upper portion of the basin for removal;
    c) an outlet in the upper portion of the basin for removing sludge-depleted water; and
    d) a sludge pit in the lower portion of the basin for removing sludge flocs.

12. The tank of claim 11 wherein the inlet includes at least three baffles arranged in spaced relation with each baffle having a free edge overlapping the free edge of an adjacent baffle, with the inlet having a cross-section which is relatively smaller where the waste-water enters and is relatively larger where the waste-water enters the basin.

13. The tank of claim 11 having a sloped bottom which terminates in the sludge pit.

14. The tank of claim 13 adapted so that the circular flow path of the waste water in the basin is along the sloped bottom and towards the sludge pit to assist in directing the sludge flocs toward the sludge pit.

15. The tank of claim 14 wherein the bottom is sloped upwardly from the inlet to the outlet.

16. The tank of claim 13 which further comprises a scraper for scraping the sludge flocs along the bottom of the basin toward the sludge pit.

17. The tank of claim 11 wherein the cross section of the inlet is adapted so that the sludge containing waste-water has a velocity of 30 to 50 meters per minute while forced to change direction, and wherein the cross section of the basin is adapted so that waste-water has a velocity of between 0.25 and 10 meters per minute along the circular path in the basin.

18. The tank of claim 11 wherein the number of baffles is sufficient so that waste-water is forced to abruptly change direction at least three times.

19. The tank of claim 11 adapted so that waste-water is forced to change direction at least three times before entering the basin and the sludge depleted water moves along towards an outlet after entering the basin such that the surface current flows in an opposite direction to that of the sludge flocs along the sloped bottom of the basin.

* * * * *